United States Patent [19]
Fenton

[11] 3,774,968
[45] Nov. 27, 1973

[54] VEHICLE SEATS AND OTHER UPHOLSTERED ITEMS

[75] Inventor: Sidney Desmond Fenton, Preston, England

[73] Assignee: Storey Brothers and Company Limited, Lancaster, England

[22] Filed: July 28, 1972

[21] Appl. No.: 276,009

[30] Foreign Application Priority Data
Aug. 3, 1971   Great Britain................... 36,524/71

[52] U.S. Cl.................. 297/452, 5/353.1, 297/219, 297/458, 297/DIG. 1
[51] Int. Cl............................ A47c 7/20, A47c 7/02
[58] Field of Search................... 297/452, 455, 457, 297/458, 218, 219, 229; 5/353.1; 264/45, 47, 166

[56] References Cited
UNITED STATES PATENTS
| | | | |
|---|---|---|---|
| 3,341,251 | 9/1967 | Costin | 297/457 X |
| 3,330,600 | 7/1967 | Robertson | 297/219 X |
| 3,318,636 | 5/1967 | Callum | 5/361 R |

FOREIGN PATENTS OR APPLICATIONS
| | | | |
|---|---|---|---|
| 1,232,381 | 5/1971 | Great Britain | 297/DIG. 2 |

Primary Examiner—Casmir A. Nunberg
Attorney—William D. Hall et al.

[57] ABSTRACT

This invention relates to the seat cushions or back rests of vehicle seats and other upholstered items. The seat cushion consists of a shaped cover within which a resilient foam filling which has been foamed in situ and so becomes bonded to the cover. The base of the foam filling is bonded to a frame for the seat and a skirt of foam is provided around at least part of the edge of the foam filling. The free edges of the shaped cover have been tucked up and secured in the recess defined by the skirt of foam and this is found to give the cushion a neat and attractive appearance in a quick and simple fashion. According to a preferred embodiment the recess defined by the skirt of foam is aligned with the upstanding edge of the frame of the seat, so locating the cushion accurately. Additionally if the recess is much deeper than necessary to accommodate the edge of the frame, this improves the comfort of the seat because the user will not notice the edge of the frame even though the resilient filling has been depressed.

8 Claims, 1 Drawing Figure

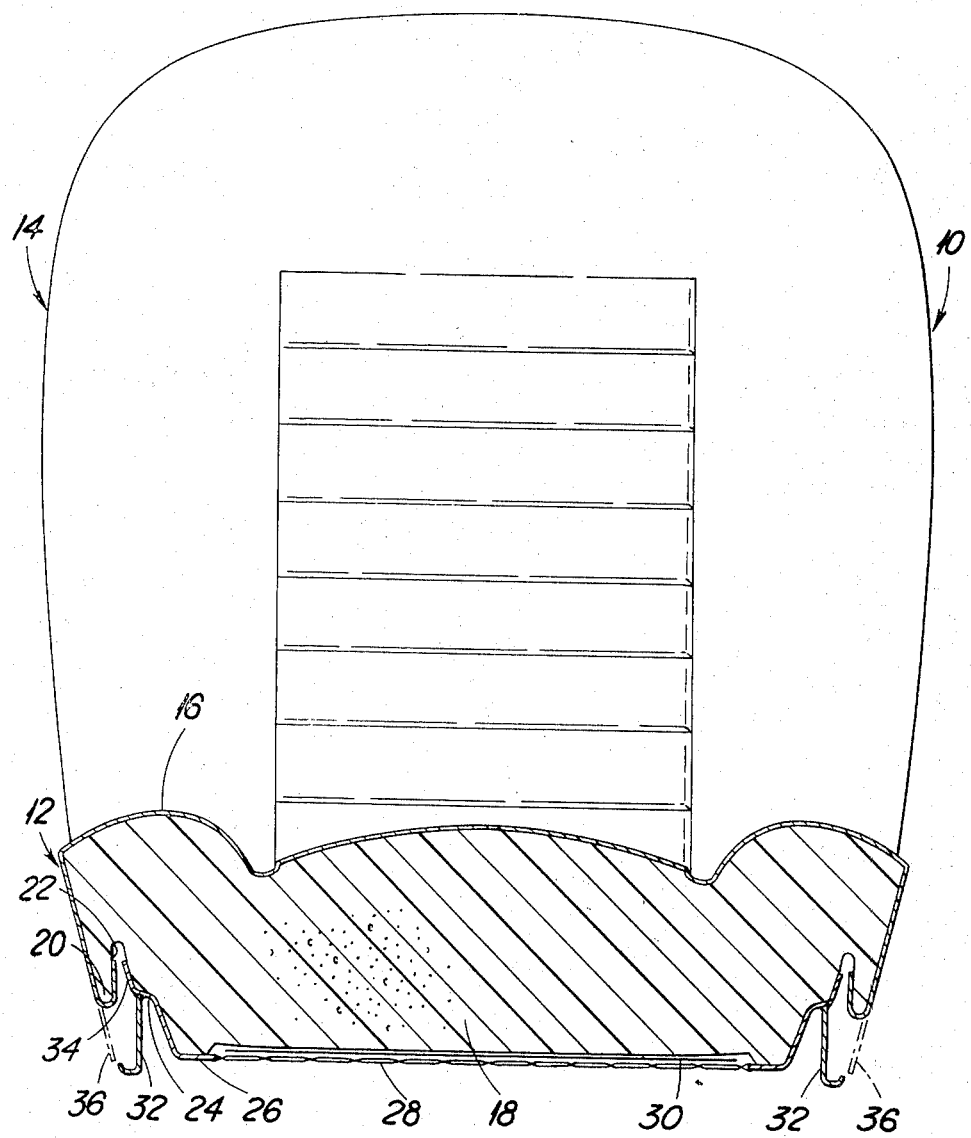

VEHICLE SEATS AND OTHER UPHOLSTERED ITEMS

This invention relates to vehicle seats and other uphostered items and in particular back rests and seat cushions for cars, settees, armchairs and the like.

BACKGROUND TO THE INVENTION

Vehicle seats generally consist of a resilient seat cushion, the part on which one sits, and a resilient back rest or aquab, the part against which one's back rests. The resiliencey of the seat cushion and back rest can be achieved by the use of a soft resilient fill, e.g., a synthetic plastics material foam, or by means of soft padding and suitable springs.

Irrespective of how the resiliency is achieved, a cover of synthetic plastics material or leather, is fitted over the resilient interior and this cover needs to be held tightly over the interior to maintain the shape of the seat cushion or back rest and fix the assembly together. Unfortunately, as soon as the resilient interior of the seat cushion or back rest is compressed by a person sitting on the seat, the cover becomes loose, leading to a badly fitting cover which will then crease and distort the intended shape of the cushion or back rest. Also through progressive permanent stretching of the cover, the appearance of the seat cushion and back rest deteriorate with time. Further the fitting of the cover over the resilient interior is a time consuming and skilled operation and requires the use of a large number of fixing clips to secure the cover to the frame of the seat.

We have found that by constructing a seat in the way described in our United Kingdom Patent No. 1,232,381 by first shaping the cover by vacuum forming a synthetic plastics material, e.g., plasticized polyvinyl chloride, and then filling this cover with a foamable mixture, e.g., a polyurethane foaming mixture, and foaming the mixture in situ, one can achieve an excellent seat cushion or back rest in which the cover is bonded to the foamed interior. In this way, the cover and resilient interior become one entity and do not distort or slip one over the other when the seat is in use or with the passage of time.

It is still necessary, however, to secure the edges of the cover to the frame of the seat to secure the seat cover or back rest in place and this is still a time consuming operation

BRIEF DESCRIPTION OF THE INVENTION

We have now found according to the present invention that if the foam is itself capable of being secured to the frame of the seat, e.g., by means of a suitable adhesive, and a skirt of foam is provided around at least part of the edge of the foam filling, i.e., in effect forming a recess around the under or back surface of the foam near the covered edges of the foam, the edges of the cover can be quickly tucked up into this recess and secured in place quickly, e.g., by means of a suitable adhesive, to the foamed skirt.

In this way we find that we can eliminate the time consuming step of securing the edges of the cover to the frame. Also the finished seat cushion or back rest has an attractive and neat final appearance.

The invention is particularly useful when applied to the seat cushion. It can however, be applied to the back rest or to both the seat cushion and back rest.

It is also advantageous for the recess around the under or back surface of the foam to coincide with any upstanding edge of the frame of the seat since this helps one to locate the seat cushion and back rest accurately. Additionally, if the recess is then made much deeper than is necessary to accommodate upstanding edge of the seat frame so that there is a gap between the frame and the roof of the recess, when the top surface of the seat cushion or front surface of the back rest is depressed by someone sitting on the seat, the edges of the seat cushion and the back rest can move freely, the frame passing further into the recess without causing creasing or buckling of those edges. This again substantially improves the appearance of the seat, particularly after long usage. Also it improves the comfort of the seat and prevents the user from noticing the rigid frame of the seat.

BRIEF DESCRIPTION OF THE DRAWING

A car seat in accordance with the invention will now be described, by way of example, with reference to the accompanying drawing which is a transverse cross-section through the seat cushion the seat looked at from the front of the seat.

DESCRIPTION OF THE PREFERRED EMBODIMENT

The car seat 10 shown in the drawings has a seat cushion 12 and back rest 14.

The seat cushion includes a cover 16 of plasticized polyvinyl chloride which has preferably been made and shaped in the manner described in our United Kingdom Patent No. 1,232,381. The cover 16 preferably has a deep embossment which simulates the appearance of leather and also improves the comfort and "feel" of the seat.

Within the cover 16 has been foamed in situ a resilient polyurethane foam filling 18. The cover 16 and filling 18 are in this way completely bonded together so as to avoid creasing and slipping of the cover over the foam when the foam is compressed or the cover becomes stretched. Preferably the foam is of the open celled type.

It will be seen that the filling 18 has integrally formed around the edges of the seat cushion a downward depending skirt 20 of foamed filling 18. This skirt defines with the remainder of the filling 18 a recess 22 positioned around the underside of the filling near to the edges of the seat cushion.

The filling 18 sits in a metal frame 24, and it will be noted that the lower surface of the filling is shaped to fit snugly within the frame 24. The metal frame 24 has a central opening 26 and a zig-zag spring mesh 28 is fixed across this opening. Interposed between this mesh 28 and the filling 18 is a sheet of canvas 30 which prevents the mesh from cutting into the foam filling 18. Fixed to the metal frame 24 are side supports 32 by means of which the seat 10 is fixed in a car.

The filling 18 is stuck to the metal frame and in this way the covered filling can quickly and simply be assembled. The metal frame 24 has an upturned edge 34 which is arranged to project up into the recess 22. This enables the filling to be accurately located within the frame without any real skill being required.

As formed, the cover has loose edges 36 which project beyond the foamed skirt 20. In conventional seats it would be necessary to fix these edges 36 to the frame to hold the cover and filling in place. In accordance with the present invention, these edges 36 are simply tucked up around the skirt 20 into the recess 22 and are secured in place by adhesive. As will be appreciated this is a very simple and quick operation which can be effected by un-skilled labour. In addition it will be noted that the final appearance of the edges is very neat and tidy.

It is advantageous to make the recess 22 comparatively deep so that the upturned edges 34 of the frame are spaced from the roof of the recess 22. In this way, when the seat cushion is depressed by someone sitting on the seat, the filling 18 can be compressed down without the roof of the recess abutting the upturned edge 34 of the metal frame. This both improves the comfort of the seat since the user of the seat cannot feel the hard edge of the metal frame, and also improves the appearance of the seat because the covering 16 around the edges of the seat is not buckled or crinkled.

The construction of the seat cushion 12 according to the invention is both simple and quick, and it can be effected without the use of highly skilled labour. The seat cushion is preferably manufactured in the way described in our copending United Kingdom Patent Application Nos. 36526/71 and 36525/71.

The construction of the back rest 14 has not been described in detail. It can be of similar construction to the seat cushion 12 or it can be of conventional construction.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

I claim:

1. An upholstered item such as a seat cushion comprising:
   a shaped cover having a top or front face and depending side edges,
   a resilient foam filling positioned within said cover and bonded to the interior surface of said cover by having been foamed in situ in the cover, said foam filling having a rear or underside free for attachment to a rigid frame for said item,
   edge portions of said depending side edges of said cover extending beyond said rear or underside of said foam filling, and a recess provided around and near at least part of the edge of said underside or rear face of said foam filling so defining a skirt of foam filling, said edge portions of said cover having been turned around and secured to said skirt within said recess.

2. An item according to claim 1 in which said edge portions of said cover have been secured in said recess by an adhesive.

3. An item according to claim 1 and further comprising a rigid frame, and means for securing said underside or rear face of said foam filling to said rigid frame.

4. An item according to claim 3 in which said underside or rear face of said foam filling has been secured to said rigid frame by means of an adhesive.

5. An item according to claim 3 in which said rigid frame has an upstanding edge which projects into said recess in said underside or rear face of said foam filling.

6. An item according to claim 5 in which said recess in said underside or rear face of said foam filling is deeper than the height of said upstanding edge of said rigid frame, whereby a gap is left between the said upstanding edge and the roof of said recess.

7. An item according to claim 6 which is a vehicle seat.

8. An item according to claim 1 which is a vehicle seat.

* * * * *